Patented Dec. 19, 1933

1,939,979

UNITED STATES PATENT OFFICE 1,939,979

LUBRICATING OIL

Alfred Henriksen and Bert H. Lincoln, Ponca City, Okla., assignors to Continental Oil Company, Ponca City, Okla., a corporation of Delaware No Drawing. Application January 26, 1933
Serial No. 653,666

4 Claims. (Cl. 87—9)

Our invention relates to an improved method for the production of high grade lubricating oil and more specifically comprises such products as new compositions of matter.

Present day mechanical devices could be economically improved as to efficiency if greater pressures could be imposed at the rubbing surfaces. The degree of pressure for which designs can be made is limited by the amount of pressure which the hydrocarbon lubricant used for lubricating the rubbing surfaces will stand without breaking down and allowing metal to metal contact. The property of lubricants which keeps them from breaking down when spread in thin films between rubbing surfaces is usually referred to as the "film strength" of the lubricant.

The primary object of this invention is to provide lubricants with high film strength which will not break down at high pressures.

In outline our invention comprises the addition of the condensation product between diphenylene oxide and halogenated organic acids to hydrocarbon lubricants.

An example of our invention is given to clarify the inventions, but not to act as a limitation thereto. Stearic acid was chlorinated by direct chlorination until an amount of chlorine equivalent to the amount contained in dichlor stearic acid was attached. One hundred and fifty grams of this chlorinated acid and seventy grams of diphenylene oxide were dissolved in 300 cc's. of carbon disulphide. To this solution was added thirty five grams of anhydrous aluminum chloride in small portions over a period of forty minutes. The reaction mixture was shaken after each addition of anhydrous aluminum chloride. After the addition of all of the anhydrous aluminum chloride, the mixture was refluxed for 3 hours at 120° F. and then the carbon disulphide solvent distilled off. The aluminum compound was broken up by dilute nitric acid and the product dissolved in petroleum ether. The ether solution was water washed and the ether distilled off. The condensation product was then ready for blending in a hydrocarbon lubricant.

In the above example the original chlor stearic acid contained approximately 23% of chlorine and the condensation product contained approximately 6% chlorine. It should be understood that larger or smaller amounts of chlorine could have been used in the stearic acid with its subsequent influence on the condensation product. It is also within the scope of this invention to blend the reacting substances in different proportions and use smaller or larger amounts of anhydrous aluminum chloride, thereby influencing the chlorine content of the finished condensation product. The final condensation product may have a chlorine content of from .1 to 25% or more by weight.

Solvents other than those mentioned above be used. Any of the organic acids may be employed, including the saturated and unsaturated organic acids, those crude organic acids from animal and vegetable oils, naphthenic acids and acids obtained by the oxidation of petroleum hydrocarbons.

Dilute inorganic acids other than nitric may be used to break up the aluminum sludge.

To demonstrate the film strength improvement of lubricating oils by the addition of our condensation product, we made tests on the Timken machine manufactured and described by the Timken Roller Bearing Company. This machine determines the pressure at which a lubricating oil will break down and allow metal to metal contact. In making the test, weights are added one by one at regular intervals which increase the load or pressure at the rubbing surfaces. The number of pound weights added before the oil film ruptures is a measure of the film strength of the lubricant being used in the test. These pound weights may be converted into approximate pounds per square inch pressure on the rubbing surface.

In making the following Timken tests a high quality hydrocarbon lubricant was used:

| | Pound weights seizure point | Pounds square inch rubbing surface |
|---|---|---|
| Straight hydrocarbon lubricant | 18.0 | 10,500 |
| 99% straight hydrocarbon lubricant+1% above condensation product | 54.9 | 31,250 |

The above examples show the vast improvement in film strength accomplished by our invention. In addition to this improvement, the coefficient of friction (oiliness) of the blended lubricant is only approximately half that of the original oil as determined by the Herschel testing machine.

Any type of hydrocarbon lubricant may be improved by this invention.

In the example given, 1% of condensation product was added to the hydrocarbon lubricant but quantities of from 0.1% to 10% or above are contemplated within the scope of this invention.

It is to be understood that any of the methods commonly employed in condensing two organic molecules may be used in place of the aluminum chloride condensation described.

Having thus described our invention, what we claim is:

1. A lubricating oil comprising in combination a hydrocarbon oil and a small percentage of a halogenated organic acid-diphenylene oxide condensation product.

2. A lubricating oil comprising in combination a hydrocarbon oil and a small percentage of a chlorinated organic acid-diphenylene oxide condensation product.

3. A lubricating oil comprising in combination a hydrocarbon oil and a small percentage of a chlorinated naphthenic acid-diphenylene oxide condensation product.

4. A lubricating oil comprising in combination a hydrocarbon oil and a small percentage of a chlorinated fatty acid-diphenylene oxide condensation product.

ALFRED HENRIKSEN.
BERT H. LINCOLN.